United States Patent [19]

Miller

[11] 4,316,668

[45] Feb. 23, 1982

[54] IMAGE REDUCTION SERVO SYSTEM

[75] Inventor: William G. Miller, East Rochester, N.Y.

[73] Assignee: Xerox Corporation, Stamford, Conn.

[21] Appl. No.: 203,174

[22] Filed: Nov. 3, 1980

[51] Int. Cl.[3] .................. G03B 27/52

[52] U.S. Cl. .................. 355/55

[58] Field of Search .................. 355/55, 56, 57

[56] References Cited

U.S. PATENT DOCUMENTS

| | | | |
|---|---|---|---|
| 3,076,392 | 2/1963 | Cerasani et al. | 95/1.7 |
| 3,476,478 | 11/1969 | Rees, Jr. | 355/55 |
| 3,906,324 | 9/1975 | Smith | 318/567 |
| 4,211,482 | 7/1980 | Arai et al. | 355/57 X |

*Primary Examiner*—Michael L. Gellner

*Attorney, Agent, or Firm*—Ronald F. Chapuran

[57] ABSTRACT

The present invention relates to a microprocessor control of optical components for variable magnification, the control including a bidirectional AC motor, a reference potentiometer, an analog to digital (A/D) converter, and triacs for driving the motor. The potentiometer voltage represents the present position of the optical components in the reproduction machine. The position of the optical components determines the actual magnification ratio of images. Upon selection of a particular magnification ratio, a digital position word from memory corresponding to the selected magnification ratio is compared to the optical component current position voltage converted through the A/D converter. Depending upon the error signal generated by the compare operation, a run bit is set to activate the motor in the direction to minimize the error signal and position the optical components to achieve the magnification ratio selected. In another feature of the present invention, as the optical components near the desired locations, the motor is selectively pulsed to progressively decrease the duty cycle of operation. For example, the duty cycle of operation is decreased from 100 percent to 70 percent, 50 percent, and 30 percent to slowly position the optical components and minimize inertia effects.

16 Claims, 7 Drawing Figures

IMAGE REDUCTION SERVO SYSTEM

The present invention relates to reproduction apparatus, and more particularly, to reproduction apparatus for making copies of original documents at different magnifications.

Various methods are known for producing copies at different magnifications. One method is to provide a plurality of lenses having different magnifying powers and to substitute one lens for another according to the degree of magnification required. This process has the disadvantage that several lenses are required and manipulation of the lenses becomes complicated.

In reproduction apparatus having stationary documents and moving optical systems, it is known to make copies of documents at different magnifications by moving a lens simultaneously with reflecting mirrors. Exemplary patents are U.S. Pat. Nos. 3,476,478; 3,542,467 and 3,614,222. Other reproduction machines, having fixed optical systems for projecting images onto a photosensitive surface, change the speed of a moving document to provide reduction copies. Exemplary patents are U.S. Pat. Nos. 3,076,392 and 3,649,114.

A difficulty with the prior art systems is that movement of optical components such as lenses and mirrors generally has been accomplished by a driving motor using either mechanical switches or a potentiometer for position feedback. The control was implemented through dedicated amplifiers and logic that was basically inflexible. For example, for each different magnification ratio, a different feedback potentiometer is often required. Also, the method of slowing down the optical components is often cumbersome and unpredictable. For example, in DC servo motor systems, it is often necessary to provide additional hardware to decrease the voltage across the motor to decrease the speed of the motor.

The use of servo motor controls using memory devices is well known. For example, U.S. Pat. No. 3,906,324 shows a machine tool control system having a microprogram digital computer provide positioning data. This data is compared with a feedback signal representing the position of the load to produce an error signal to activate the servo unit to drive the load. However, the movement of the load is often abrupt with no provision for the smooth deceleration of the motor speed. In addition, the servo system is not adapted to control the movement of optical components such as a platen and lens in order to provide various magnification ratios in reproduction apparatus.

It would therefore be desirable to provide a reproduction machine having a flexible, economical control for changing magnification, in particular having a control in which the motor speed and optical component positioning is achieved for a variety of magnification ratios in a smooth predictable fashion.

It is therefore an object of the present invention to provide a new and improved magnification system in a reproduction machine having a microprocessor controlling a servo system including a bidirectional AC motor to move the optical components in a smooth and accurate manner to obtain various magnification ratios. Further advantages of the present invention will become apparent as the following description proceeds, and the features characterizing the invention will be pointed out with particularity in the claims annexed to and forming a part of this specification.

Briefly, the present invention is concerned with a microprocessor control of optical components, the control including a bidirectional AC motor, a reference potentiometer, an analog to digital (A/D) converter, and triacs for driving the motor. The potentiometer voltage represents the present position of the optical components in the reproduction machine. The position of the optical components determines the actual magnification ratio of images provided by the reproduction machine. Upon selection of a particular magnification ratio, a digital position word from memory corresponding to the selected magnification ratio is compared to the optical component present position voltage converted through the A/D converter. Depending upon the error signal generated by the compare operation, a run bit is set to activate the motor in the direction to minimize the error signal and position the optical components to achieve the magnification ratio selected.

In another feature of the present invention, as the optical components near the desired locations, the motor is selectively pulsed to progressively decrease the duty cycle of operation. For example, the duty cycle of operation is decreased from 100 percent to 70 percent, 50 percent and 30 percent to slowly position the optical components and minimize inertia effects.

For a better understanding of the present invention, reference may be had to the accompanying drawings wherein the same reference numerals have been applied to like parts and wherein FIG. 1 is a schematic elevational view of a reproduction machine incorporating the features of the present invention;

Figure 1:
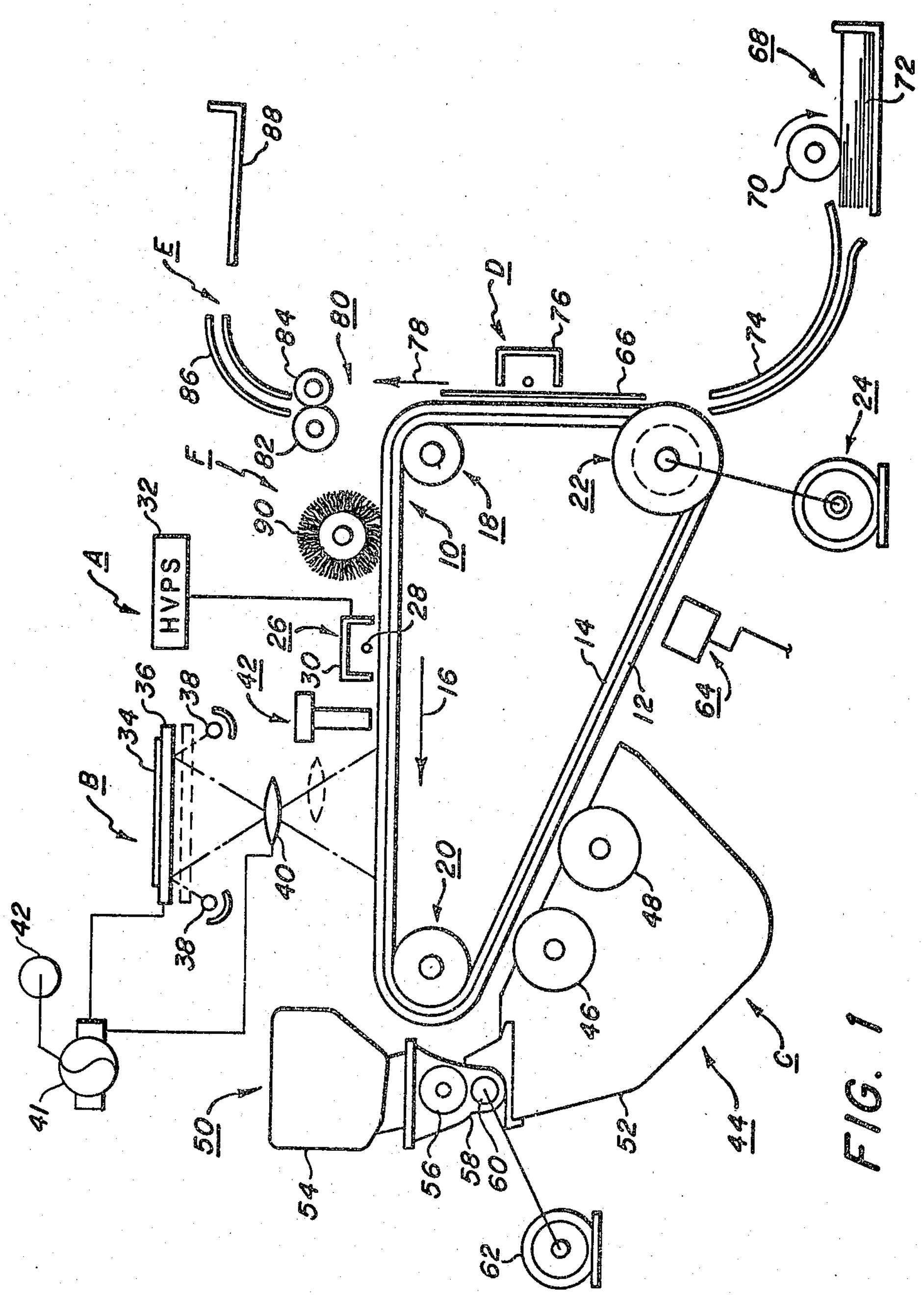

With reference to FIG. 1, there is illustrated a reproduction machine having a belt 10 with a photoconductive surface 12 moving in the direction of arrow 16 to advance the photoconductive surface 12 sequentially through various processing stations. At charging station A, a corona generating device 26 electrically connected to high voltage power supply 32 charges the photoconductive surface 12 to a relatively high substantially uniform potential. Next, the charged portion of the photoconductive surface 12 is advanced through exposure station B. At exposure station B, an original document 34 is positioned upon a transparent platen 36. Lamps 38 illuminate the original document and the light rays reflected from the original document 34 are transmitted through lens 40 onto photoconductive surface 12.

The exposure station B also includes a magnification drive motor 41 mechanically linked to following potentiometer 42 to drive the platen 36 and lens 40. In particular, the motor 41 positions the lens 40 and platen 36 at the required relationship with respect to photoconductive surface 12 to achieve a selected magnification ratio. Alternate lens and platen positions to achieve a different magnification ratio are illustrated in phantom. In a preferred embodiment, there is a continuous magnification range from 1.00x to 0.067x.

A magnetic brush development system 44 advances a developer material into contact with the electrostatic latent image at development station C. Preferably, the magnetic brush development system 44 includes two magnetic brush developer rollers 46 and 48. Each developer roller forms a brush comprising carrier granules and toner particles. The latent image attracts toner particles from the carrier granules forming a toner powder image on the latent image. A toner particle dispenser 50 is arranged to furnish additional toner particles to housing 52. In particular, a foam roller 56 disposed in a sump 58 dispenses toner particles into an auger 60. Motor 62 rotates the auger to advance the toner particles to the housing 52.

At the transfer station D, a sheet for support material 66 is moved into contact with the toner powder image. The sheet of support material is advanced to the transfer station by sheet feeding apparatus 68, preferably including a feed roll 70 contacting the uppermost sheet of stack 72. Feed roll 70 rotates so as to advance the uppermost sheet from stack 72 into chute 74. The chute 74 directs the advancing sheet of support material into contact with the photoconductive surface 12 in timed sequence in order that the toner powder image developed thereon contacts the advancing sheet of support material at the transfer station.

Transfer station D includes a corona generating device 76 for spraying ions onto the underside of sheet 66. This attracts the toner powder image from photoconductive surface 12 to sheet 66. After transfer, the sheet continues to move into a conveyor (not shown) which advances the sheet to fusing station E.

Fusing station E includes a fuser assembly 80 for permanently affixing the transferred powder image to sheet 66. Preferably, the fuser assembly comprises a heated fuser roller 82 and a backup roller 84. The sheet 66 passes between the fuser rollers with the toner powder image contacting fuser roller 82. After fusing, the chute 86 drives the advancing sheet 66 to catch tray 88 for removal from the printing machine by the operator.

Figure 2:
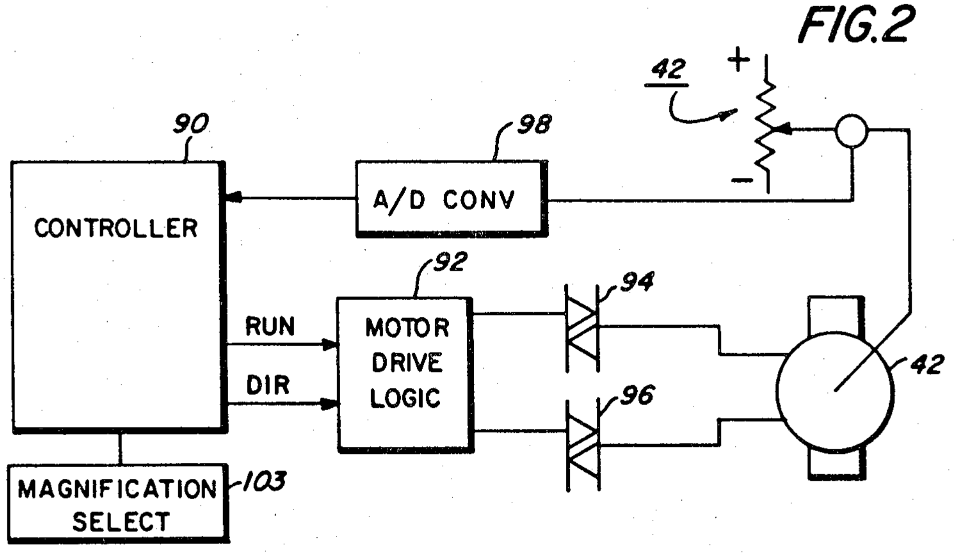
FIGS. 2 and 3 are schematics illustrating the control of the motor shown in accordance with the present invention.

In accordance with the present invention, with reference to FIG. 2, the control for motor 41 is provided by controller 90, and motor drive logic 92, forward triac 94, and reverse triac 96 electrically connecting the controller 90 to the motor 41. The control loop is completed by the following potentiometer 42, preferably a linear rotational potentiometer, providing motor position signals to the controller 90 through an 8 bit analog to digital converter 98. In essence, the control is a position feedback control system using the following potentiometer connected through the analog to digital converter to the machine controller. The controller 90 decodes the feedback position signal and compares it to a desired position signal. The correct motor direction is then selected and the motor 41 driven to move the platen 36 and the lens 40 to the correct positions for the desired magnification ratio. As the lens 40 and platen 36 approach the desired positions, in accordance with another feature of the present invention, the motor 41 is pulsed to gradually slow the movement of the lens and the platen to minimize the effects of inertia and coast.

Preferably, the motor 41 rotates 300 degrees within five seconds. The 8 bit analog to digital converter 98 converts a 340 degree effective electric angle of the potentiometer 42 into $2^{8}-1$(255) discrete stops. Any one of the discrete stops is theoretically selectable. There are 255 discrete steps within the 300 degree rotation of the motor shaft or $1.57\times10^{-3}$ magnification units per step.

In operation, with reference to FIG. 1, assume that the platen 36 and lens 40 positions are as illustrated in solid lines, representing the normal 1:1 magnification ratio. To set the machine for an alternative magnification ratio, a suitable selector switch illustrated as magnification select 103 in FIG. 2 is activated. The magnification select 103 is in electrical communication with controller 90. Assume that the platen and lens positions as shown in phantom in FIG. 1 are the locations for a 0.67 selected magnification ratio.

Figure 3:
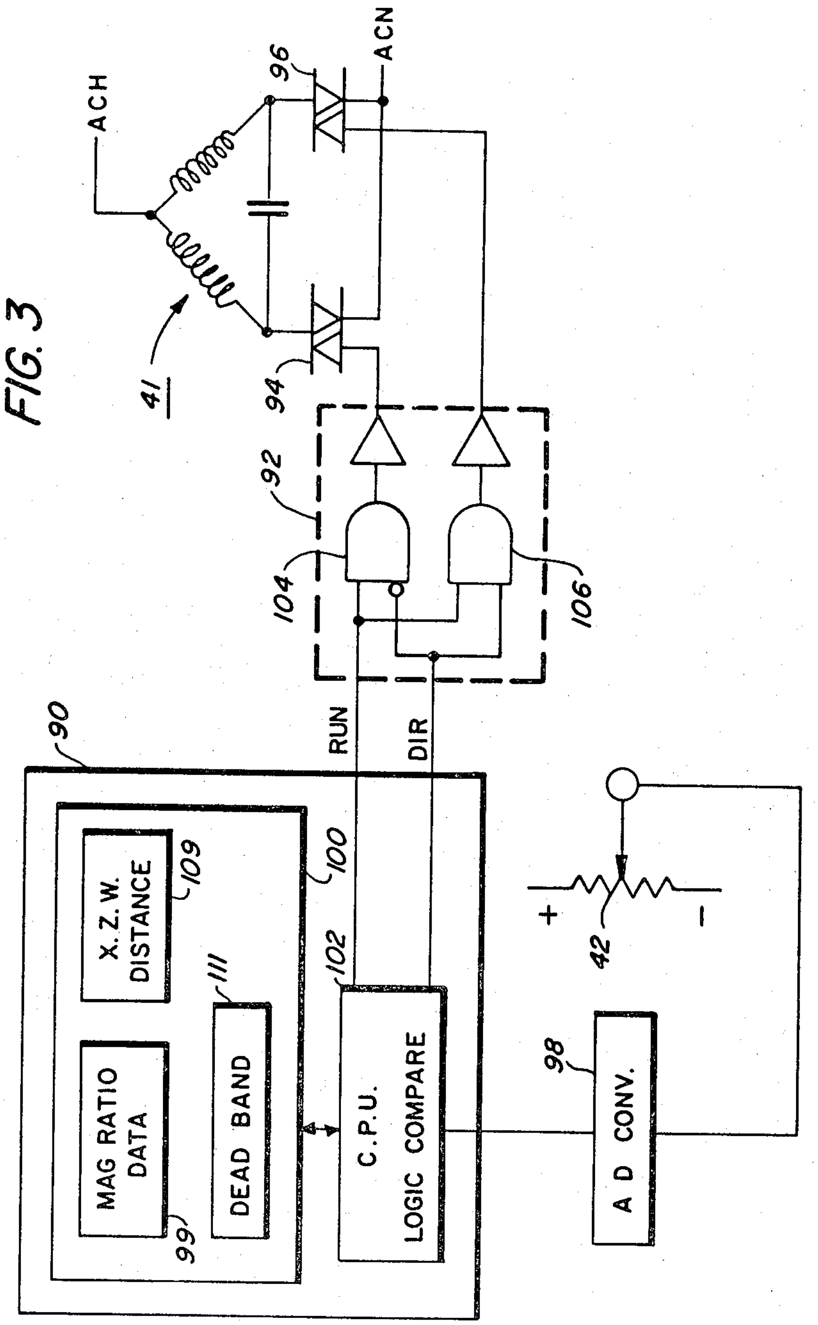

Corresponding to the 0.67 magnification ratio and for every discrete magnification ratio available for selection, there is stored a corresponding digital word in section 99 in the memory 100 of controller 90 as illustrated in FIG. 3. Therefore, when the 0.67 magnification ratio is selected, a digital word corresponding to that magnification ratio is read from memory 100. This digital word represents the desired position of the platen 36 and lens 40 to achieve the 0.67 magnification ratio. This digital word is compared with the digital equivalent manifesting the present location of the platen 36 and lens 40 as illustrated by CPU logic compare 102 in FIG. 3.

The present location position is given by the potentiometer 42 providing a voltage signal to the analog to digital converter 98, and the analog to digital converter 98 in turn provides a digital equivalent to compare with the 0.67 magnification ratio digital word read from memory.

The error signal generated by the logic compare 102 provides a run signal (RUN) and a direction signal (DIR) to the motor drive logic 92 shown in FIG. 2. In particular, the motor drive logic 92 as illustrated in FIG. 3 includes a gate and driver 104 connected to triac 94 and a gate and driver 106 connected to triac 96. The DIR signal is conveyed directly to gate and driver 106 and inverted at the input to gate and driver 104.

In particular, depending upon the required direction of movement, the DIR signal will enable either the gate and driver 104 or the gate and driver 106. Therefore, either triac 94 or triac 96 will be activated upon generation of the RUN signal by the logic compare 102 to drive the motor 41 in the desired direction. As the platen 36 and lens 40 are driven toward the proper locations, the potentiometer 42 continually monitors present position to compare with the desired position. When there is no error signal, the motor 41 stops and the lens 40 and platen 36 are at the correct positions.

In accordance with another feature of the present invention, as the platen 36 and lens 40 approach the required locations, the motor 41 is pulsed or operated at a less full duty cycle to slow the speed of movement and minimize the effects of lens and platen coast.

Figure 4:
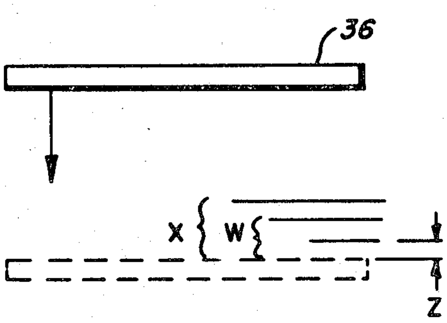
FIG. 4 illustrates the platen movement shown in FIG. 1.

For example, as the platen 36 moves within a distance X of the desired location shown in phantom in FIG. 4, the run bit or signal will be provided only 70 percent of the time normally required for driving the motor 41 at full speed. Thus, the motor 41 will be driven at a 70 percent duty cycle. Similarly, distances Z and W are progressively closer to the desired location. Since the present is constantly monitored by the potentiometer 42, the platen moving within the Z and W distances, respectively, will cause the motor to be pulsed at 50 percent and 30 percent duty cycles, respectively. The distances X, Z, W are stored in suitable locations 109 in the memory 100 to be compared with the present position data from converter 98.

In accordance with an alternate feature of the present invention, a predetermined distance or deadband space can be established to shut off the motor 41 before the lens and the platen reach the required location. In other words, the present position of the platen 36 and lens 40 are monitored and upon reaching a certain distance from the desired position, the motor 41 is inactivated to allow the platen and lens to coast to the actual position.

A deadband distance is stored in a suitable location III in memory 100. This distance is periodically compared to present position data from potentiometer 42. When the present position data manifests the stored deadband distance, no error signal will be generated. A zero error signal prevents generation of a RUN signal and the motor movement stops.

It can be appreciated that depending upon the speed of the motor and the inertia of the optical components such as the platen and the lens, a suitable predetermined distance can be stored in memory in the form of a digital word. This distance will be the motor shut off distance. That is, the motor will be shut off to allow the effects of inertia to carry the optical components to the desired positions.

Figure 5:
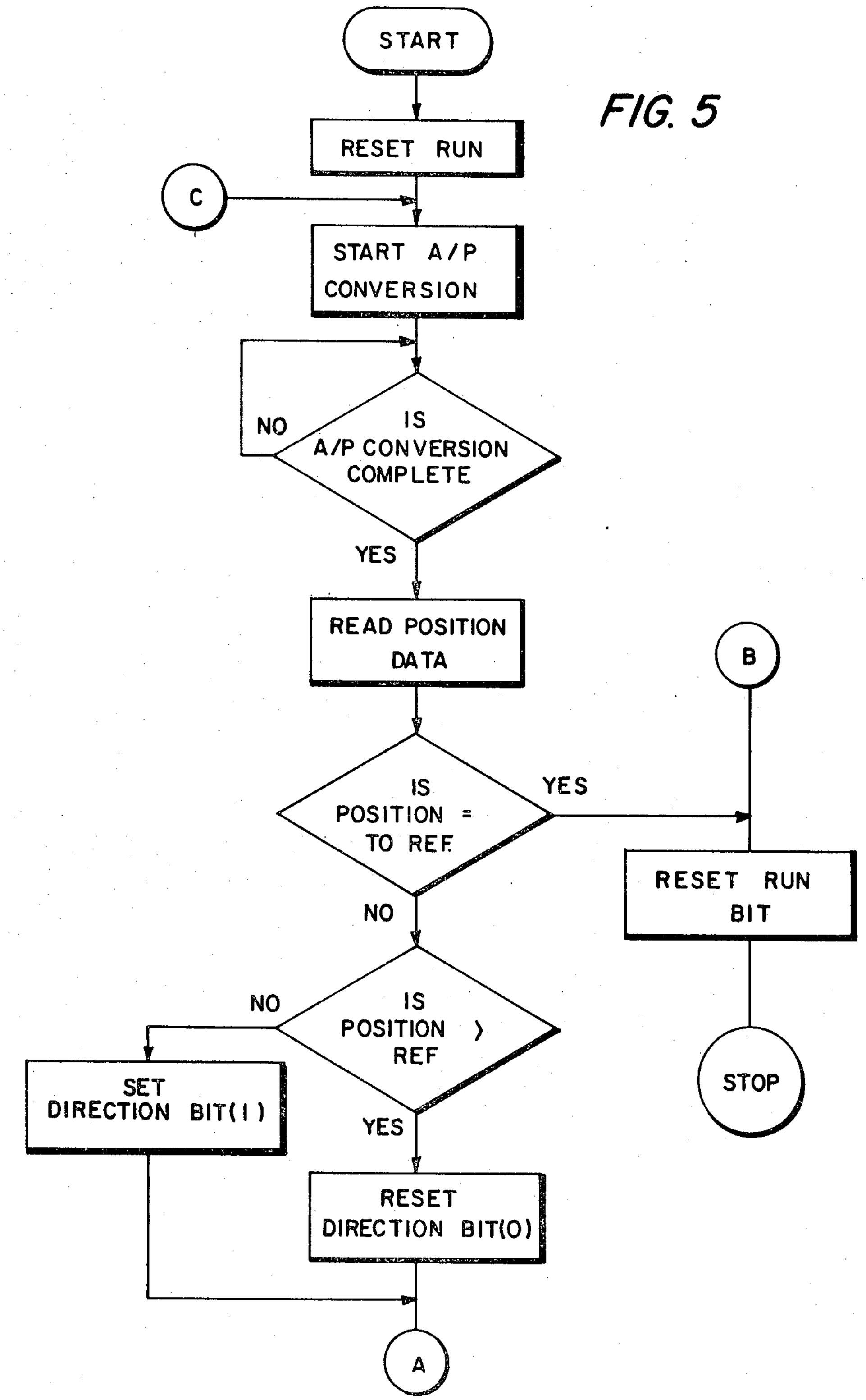
FIGS. 5, 6 and 7 are flow charts illustrating the sequence of operation of the control in accordance with the present invention.
Figure 6:
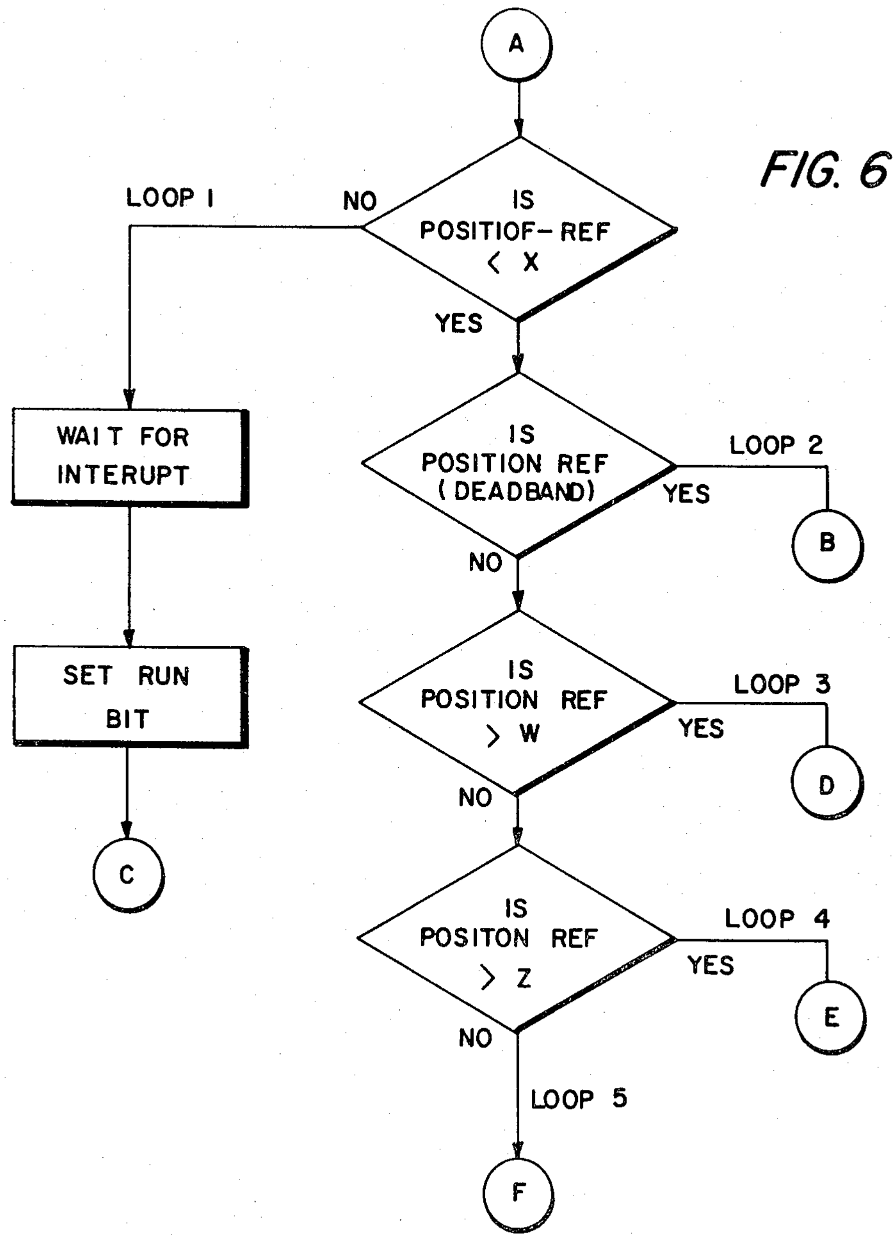
Figure 7:
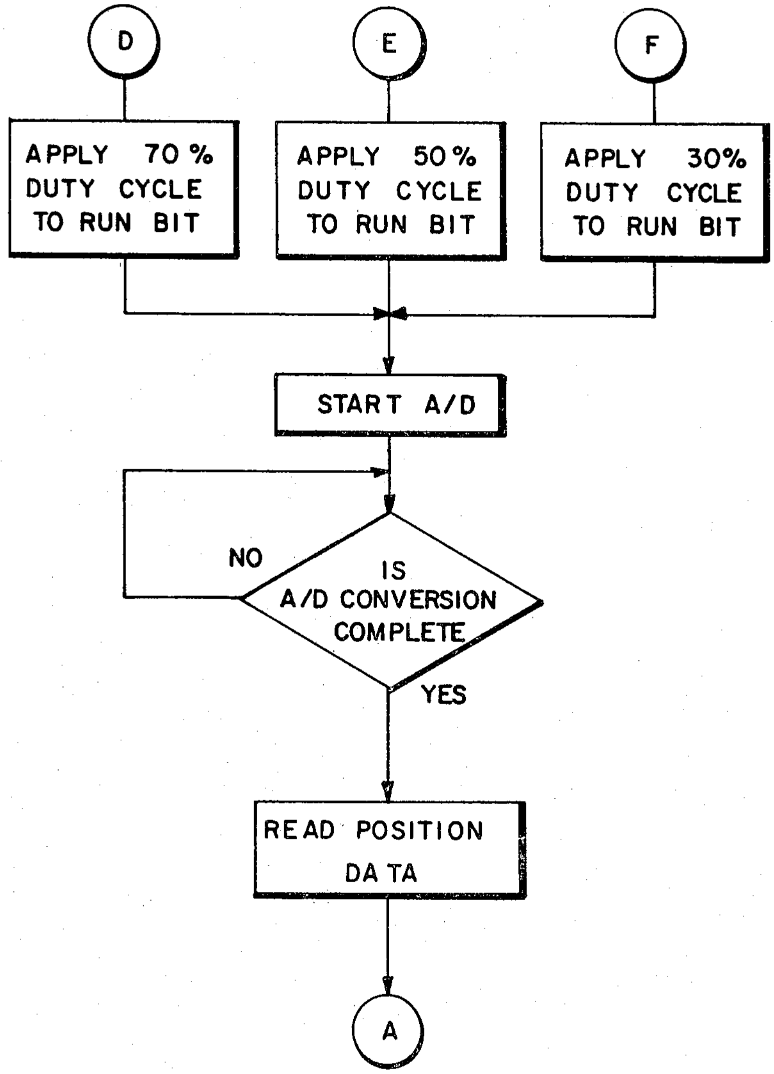

The procedure for driving the motor, as shown in FIGS. 5, 6 and 7 is to initially set the run bit in the CPU and logic compare 102 to zero. Essentially this assures that the motor is not running. The first step, then, is to read the position data from the following potentiometer 42. That is, it is necessary to set the analog to digital converter 98 select bit. This initiates the start analog to digital conversion. Once the analog to digital conversion is complete, the position data is read from the analog to digital converter 98 into the controller 90.

The position data is then compared to the digital word read from memory corresponding to the selected magnification ratio. If the position data is equal to the selected digital word, it is not necessary to activate the motor to drive the platen and lens and the motor is stopped or remains stopped. This is done by resetting the run bit to zero.

On the other hand, if the position data is different than the selected digital word, movement of the optical components is required. It is therefore necessary first to determine the direction of difference in order to drive the motor and the components in the right direction. If the position data is greater than the selected digital word, a direction bit will be reset to zero as indicated by reset in FIG. 5, to drive the motor in a first direction. On the other hand, if the position data is less than the selected digital word, the direction bit will be set to one (1) as indicated in FIG. 5 to drive the motor in a second direction.

In accordance with the present invention, control distances X, Z and W are constantly monitored. With reference to FIG. 6, as long as the lens or the platen is at a distance greater than X from the desired position, the motor will continue to drive the platen and the lens at full speed represented by loop 1.

If the distance between the actual position and reference position is less than the value X, a motor slow down procedure is used. There is first an optional procedure called programmable deadband to compensate for motor or component coast. In other words, the motor can be stopped at a predetermined distance before the lens or platen reaches the desired position. This distance is usually a distance less than X and can vary depending upon the motor speed and the inertia of the components being driven. With reference to FIG. 6, loop 2, if the deadband distance is reached, the run bit is reset to stop the motor to allow the components to coast into the proper position. The deadband feature is optional and need not be part of the control.

The slowdown feature as illustrated in FIGS. 6 and 7, loops 3, 4 and 5, is to reduce the speed of the motor to smooth the transition of the lens and platen to the proper locations. In particular, the distances W and X represent the position or distance of the optical components from the desired position requiring a 70 percent duty cycle to be applied to the motor. For example, if the distance of the platen is less than X and greater than W from the desired position, a 70 percent duty cycle run bit is applied to the motor. In other words, the triac activating the motor is activated only 70 percent of the time. This is illustrated by loop 3 in FIGS. 6 and 7.

The next reference distance is the distance Z. If the distance of the platen or lens from the desired location is less than W but greater than Z, a 50 percent duty cycle is applied to the motor. This is illustrated by loop 4 in FIGS. 6 and 7. And finally, if the distance is less than Z, the motor operates a 30 percent duty cycle as illustrated by loop 5. After the proper duty cycle is applied another analog to digital conversion cycle is initiated as illustrated in FIG. 7. The position data is read and the control repeats the sequence. It should be understood that the 70, 50, 30 duty cycle is only exemplary and various speed reductions could be used to provide a smooth transition of the optical components to the proper locations.

While there has been illustrated and described what is at present invention, it will be appreciated that numerous changes and modifications are likely to occur to those skilled in the art and it is intended in the appended claims to cover all those changes and modifications which fall within the true spirit and scope of the present invention.

I claim:

1. A reproduction machine for producing copies of a document selectively at one of a plurality of copy image magnification ratios including a photosensitive surface, a magnification selector an optical arrangement for projecting images onto the photosensitive surface at a selected magnification, a control with associated memory, the improvement comprising means for reading a word from memory corresponding to the selected magnification ratio, means manifesting the current magnification ratio position of the optical arrangement, means to compare the selected magnification ratio with the current magnification ratio position manifestation, and means responsive to the comparison to change the optical arrangement to the selected magnification ratio.

2. In a reproduction machine having a photosensitive member, a platen for supporting documents, an optical system for projecting images of documents onto the photosensitive member, the optical system including a lens, a control including a memory, the memory storing digital representations of magnification ratios, the method of changing magnification ratios comprising the steps of:

selecting a magnification ratio, calling a digital word from memory corresponding to the selected magnification ratio, providing a digital equivalent of the current magnification ratio, comparing the digital equivalent of the current magnification ratio with the selected digital word, and driving one of the platen and the lens response to the compare operation to change the reproduction machine to the selected magnification ratio.

3. The method of claim 2 wherein a potentiometer manifests the current magnification ratio including the step of converting the potentiometer voltage to a digital signal.

4. The method of claim 2 including a motor mechanically connected to the platen and lens, a forward triac and a reverse triac electrically connected to the motor, the step of activating either the forward or reverse triac in response to the compare operation.

5. A programmable control for variable magnification in a reproduction machine comprising the steps of setting modes of magnification in memory, decoding a selected mode, driving a motor in response to the selected code to position an optical element defining a selected magnification ration and selectively pulsing the motor upon detecting that the optical element is near the selected magnification ration.

6. The method of claim 5 wherein the step of selectively pulsing the motor includes the steps of:

determining that the optical element is a given first distance from a selected location defined by the selected magnification ratio and slowing the motor in response to said determination.

7. The method of claim 6 including the steps of pulsing the motor at an approximately a 70 percent duty cycle upon determining that the optical element is at said first distance, pulsing the motor at approximately a 50 percent duty cycle upon determining that the optical element is at a second distance from the selected location and repeating the process for progressively closer distances and successively lower duty cycles until the optical element reaches the selected distance.

8. The method of claim 5 including the steps of determining that the optical element is at a shut off distance from the selected location, stopping the pulsing of the motor, and allowing the optical element to coast to the selected location.

9. The method of claim 5 wherein the optical element is a lens and including the step of driving the lens to a location corresponding to the selected magnification ratio.

10. The method of claim 5 wherein the optical element is a platen and including the step of driving the platen to a location corresponding to the selected magnification ratio.

11. In a reproducing apparatus for producing copies of a document selectively at one of a plurality of copy image magnification ratios including a photosensitive surface, a magnification select control an optical arrangement for projecting images onto the photosensitive surface at a selected magnification, a control with associated memory, the improvement comprising a memory storing words corresponding to the selected magnification ratio, a potentiometer providing a voltage manifesting the current magnification ratio position of the optical arrangement, an A/D converter to change the voltage to a digital signal means to compare the selected magnification ratio word with the converted digital signal and means responsive to the comparator to move the optical arrangement to the selected magnification ratio.

12. The apparatus of claim 11 wherein the optical arrangement includes a lens, the lens being movable to positions corresponding to the selected magnification ratio.

13. The apparatus of claim 11 wherein the optical arrangement includes a platen, the platen being movable to positions corresponding to the selected magnification ratios.

14. The apparatus of claim 11 wherein the means responsive to the comparator includes a forward triac, a reverse triac, a motor electrically connected to the triacs, and logic gates, the logic gates being responsive to a run signal and a direction signal to selectively enable the motor through the triacs to drive the optical arrangement to the position corresponding to the selected magnification ratio.

15. The apparatus of claim 11 wherein the periodic activation of the run signal and direction signal provides selective direction and duty cycle operation of the motor.

16. The apparatus of claim 15 wherein the motor is an AC motor.

* * * * *

UNITED STATES PATENT AND TRADEMARK OFFICE
CERTIFICATE OF CORRECTION

PATENT NO. : 4,316,668

DATED : February 23, 1982

INVENTOR(S) : William G. Miller

It is certified that error appears in the above—identified patent and that said Letters Patent is hereby corrected as shown below:

Column 7, line 23, "ration" should read -- ratio --.

Column 7, line 25, "ration" should read -- ratio --.

Signed and Sealed this

***Twenty-seventh* Day of *April 1982***

|SEAL|

*Attest:*

GERALD J. MOSSINGHOFF

*Attesting Officer* *Commissioner of Patents and Trademarks*